United States Patent
Akazawa et al.

(10) Patent No.: US 8,075,706 B2
(45) Date of Patent: Dec. 13, 2011

(54) PASTE COMPOSITION FOR ALUMINUM BRAZING

(75) Inventors: Tomoaki Akazawa, Kakogawa (JP); Masaki Teruse, Kakogawa (JP); Ichiro Taninaka, Kakogawa (JP); Shoei Teshima, Kariya (JP); Kinya Yamamoto, Kariya (JP); Akira Itoh, Kariya (JP); Ken Muto, Kariya (JP)

(73) Assignees: Harima Chemicals, Inc., Hyogo (JP); Denso Corporation, Aichi (JP)

( * ) Notice: Subject to any disclaimer, the term of this patent is extended or adjusted under 35 U.S.C. 154(b) by 29 days.

(21) Appl. No.: 12/340,196

(22) Filed: Dec. 19, 2008

(65) Prior Publication Data

US 2009/0165893 A1 Jul. 2, 2009

(30) Foreign Application Priority Data

Dec. 21, 2007 (JP) ................. 2007-331121

(51) Int. Cl.
 *B23K 35/34* (2006.01)
(52) U.S. Cl. ............................ 148/24; 148/23
(58) Field of Classification Search ............... 148/22–25
 See application file for complete search history.

(56) References Cited

U.S. PATENT DOCUMENTS

| | | | | |
|---|---|---|---|---|
| 4,561,913 A | * | 12/1985 | Zado | 148/23 |
| 5,156,326 A | * | 10/1992 | Gibson | 228/223 |
| 5,167,729 A | | 12/1992 | Takemoto et al. | |
| 5,690,271 A | | 11/1997 | Dudel | |
| 6,234,377 B1 | * | 5/2001 | Teshima et al. | 228/183 |
| 6,234,381 B1 | * | 5/2001 | Hasegawa et al. | 228/223 |

FOREIGN PATENT DOCUMENTS

| | | | |
|---|---|---|---|
| EP | 1 127 653 | A | 8/2001 |
| GB | 379 347 | A | 8/1932 |
| JP | 2-147193 | A | 6/1990 |
| JP | 3-035870 | A | 2/1991 |
| JP | 6-039586 | A | 2/1994 |
| JP | 7-155987 | A | 6/1995 |
| JP | 2681380 | B2 | 8/1997 |
| JP | 2873695 | B2 | 1/1999 |
| JP | 2000-079496 | A | 3/2000 |
| JP | 2000-141083 | A | 5/2000 |
| JP | 2000-153393 | A | 6/2000 |
| JP | 2001-225185 | A | 8/2001 |
| JP | 2001-293593 | A | 10/2001 |
| JP | 3247150 | B2 | 11/2001 |
| JP | 3705939 | B2 | 8/2005 |
| JP | 2008-207237 | A | 9/2008 |

OTHER PUBLICATIONS

Machine translation of JP 07-155987.*

* cited by examiner

*Primary Examiner* — Stanley Silverman
*Assistant Examiner* — Brian Walck
(74) *Attorney, Agent, or Firm* — Sughrue Mion, PLLC

(57) ABSTRACT

A paste composition for aluminum brazing of the invention contains 40 to 65% by weight of a metal powder for brazing (a), 5 to 35% by weight of a fluoride type flux (b), 1 to 10% by weight of a methacrylic acid ester type polymer (c), and 10 to 40% by weight of an organic solvent (d); and the component (d) is a hydrocarbon type organic solvent having no aromatic ring and no hydroxyl group and the composition is in a paste-like state having a viscosity of 6,000 to 200,000 mPa·s at 23° C. and accordingly, the storage stability and applicability (practically, discharge property and pressure stability by using a dispenser) and brazing property can be improved in good balance.

8 Claims, No Drawings

PASTE COMPOSITION FOR ALUMINUM BRAZING

BACKGROUND OF THE INVENTION

1. Field of the Invention

The present invention relates to a paste composition for aluminum brazing excellent in storage stability, applicability, and brazing property.

2. Description of Related Art

Members made of aluminum or aluminum alloys are employed, for example, for automotive aluminum heat exchangers represented by an evaporator, a condenser, and the like to be disposed in vehicles. At the time of brazing these members, compositions containing binders to be mixed to brazing fluxes or mixtures of fluxes and brazing filler metals for even adhesion to joining parts are applied to brazing parts and thereafter, assembling process and heating is carried out to execute a brazing work.

There are following conventional techniques (1) to (6) for such compositions for aluminum brazing.

(1) Japanese Patent No. 2681380

Disclosed is a brazing composition for aluminum or aluminum alloys containing a metal powder for brazing, an acrylic resin with a molecular weight of 1,000 to 100,000 (binder), and either water or an organic solvent and having a solution viscosity of 10 to 5,000 cps (claim 1 to claim 3 in Claims).

However, in the invention disclosed in the above-mentioned Japanese Patent No. 2681380, it is allowed to use water as a solvent. If water is used, aluminum alloys and water cause reaction with the lapse of time to generate hydrogen and thus there is a problem of storage stability and safety. Further, if the solution viscosity is 10 to 5,000 cps (mPa·s), the metal powder for brazing is precipitated with the lapse of time and also it is a problem in terms of storage stability. Furthermore, at the time of application to a mother material, since the viscosity is low, there is a problem that dripping occurs and thus stable brazing cannot be carried out. Further, in order to carry out brazing, it is required to additionally supply fluxes and the operation is complicated (see lines 22 to 24 of fourth paragraph).

Furthermore, in the invention of the above-mentioned Japanese Patent No. 2681380, since the acrylic resin is used as a binder, there is a problem that the brazing property is deteriorated (see Comparative Example 4 described later).

(2) Japanese Patent No. 2873695

A manufacturing method of a heat exchanger using brazing compositions for aluminum or aluminum alloys similar to those described in the above-mentioned Japanese Patent No. 2681380 is disclosed (claim 1 to claim 3 in Claims).

However, Japanese Patent No. 2873695 also has similar problems as those of the above-mentioned Japanese Patent No. 2681380.

(3) Japanese Patent No. 3247150

A composition for brazing containing a metal powder for brazing, a binder resin, and a $C_1$-$C_8$ aliphatic alcohol is disclosed (claims 1 and 4).

Examples of the above-mentioned binder resin include acrylic or methacrylic resins with a molecular weight of 1,000 to 100,000 and butyl acrylate is exemplified in Examples 1 to 9 (paragraph 9 and paragraphs 23 to 32).

However, according to the above-mentioned Japanese Patent No. 3247150, a test result that if a $C_1$-$C_8$ aliphatic alcohol (such as methanol, ethanol, propanol, and the like; claim 3) is used as a solvent for a composition for brazing, the brazing property becomes good as compared with that in the case of using another solvent is described (see Table 1); however actually there is a problem that the brazing property is deteriorated (see Comparative Example 4 described later).

(4) Japanese Patent No. 3705939

A paste composition for aluminum brazing containing 30 to 70% by weight of a metal powder for brazing, 2 to 30% by weight of a flux, 1 to 15% by weight of butyl rubber and/or petroleum resin ($C_5$ type, $C_9$ type petroleum resin: paragraph 11) (binder), and an organic solvent as the balance (0.1 to 67% by weight: paragraph 12) is disclosed (claim 1). The organic solvent as used herein may be those in which butyl rubber is soluble and toluene, hexane, cyclohexane and the like are exemplified (paragraph 12).

However, in the invention described in Japanese Patent No. 3705939, since butyl rubber is used as a binder, there are problems of having malodor and dripping (see Comparative Example 5 described later).

(5) Japanese Unexamined Patent Publication No. 2001-225185

A paste composition for aluminum brazing containing 10 to 70% by weight of a metal powder for brazing, 2 to 50% by weight of a flux, 1 to 15% by weight of a binder, and an organic solvent as the balance (0.1 to 87% by weight: paragraph 17) is disclosed (claim 1). Examples of the binder as used herein include a mixture of an acrylic resin and butyl rubber, or an acrylic resin and petroleum resin ($C_5$ type, $C_9$ type petroleum resin), and the like (claim 1, paragraph 16). Further, the organic solvent as used herein may be those in which a binder is soluble and toluene, hexane, cyclohexane and the like are exemplified (paragraph 17). In addition, there is a description that the above-mentioned composition for brazing may contain various kinds of additives such as a thickener, a plasticizer, and the like (paragraph 23).

However, in the invention described in Japanese Unexamined Patent Publication No. 2001-225185, it is required to use a butyl rubber or a petroleum resin together with an acrylic resin since the brazing property is deteriorated if the acrylic resin is used alone as a binder (see Comparative Example 2 in Table 2), and due to that, there is the following problem. That is, compatibility of a resin becomes worse, which causes deterioration of applicability due to gelation of the resin.

(6) Japanese Unexamined Patent Publication No. 7-155987

A paste composition for brazing aluminum members containing 100 parts by weight of a metal powder for brazing, 0.5 to 15 parts by weight of a flux, 0.5 to 50 parts by weight of a binder composed of a polyalkylene oxide type resin with an average molecular weight of 100,000 to 5,000,000, and 30 to 150 parts by weight of an organic solvent is disclosed (claim 1, paragraph 31). Further, it is described that the paste for brazing may contain a wax, a hardened oil, a hardened caster oil, a fatty acid amide, a polyamide and the like as a viscosity adjustment agent, and the viscosity of the paste is generally 5,000 to 500,000 cps/23° C. (paragraph 29).

However, the invention described in Japanese Unexamined Patent Publication No. 7-155987 uses a polyalkylene oxide type resin as a binder, thereby thermal decomposition property is essentially inferior. Accordingly, there is a problem that a black residue occurs when the atmosphere (oxygen concentration) at the time of brazing is relatively high.

SUMMARY OF THE INVENTION

An object of the invention is to provide a paste composition for aluminum brazing with improved storage stability, applicability (practically, discharge property and pressure stabilization by using a dispenser and the like), and brazing property in good balance.

With respect to a paste composition for aluminum brazing, in consideration of deterioration of storage stability due to using water as a solvent, deterioration of the brazing property due to using an acrylic resin as a binder or an alcohol as a solvent, and adding a metal powder for brazing, a flux, a binder, and an organic solvent collectively to the composition for brazing and supplying all together for easy and quick application, as described above, the inventors of the invention have made various investigations to solve all of the above-mentioned problems. As a result, the inventors have found that the storage stability, applicability, and brazing property can be improved in good balance by specifying the respective contents of a metal powder for brazing, a flux, a binder, and an organic solvent, the viscosity of the entire composition, the types of the binder and the organic solvent, and these findings have now led to completion of the invention.

That is, a paste composition for aluminum brazing of the invention comprises 40 to 65% by weight of a metal powder for brazing (a), 5 to 35% by weight of a fluoride type flux (b), 1 to 10% by weight of a methacrylic acid ester type polymer (c), and 10 to 40% by weight of an organic solvent (d); and the component (d) is a hydrocarbon type organic solvent having no aromatic ring and hydroxyl group and the composition is in a paste-like state having a viscosity of 6,000 to 200,000 mPa·s at 23° C.

An aluminum brazing method of the invention is a method of brazing a member made of aluminum and is characterized in that the paste composition for aluminum brazing of the invention is applied to the member and the member is heated in a state that it is assembled in a prescribed structure.

In the invention, aluminum means both of pure aluminum and an aluminum alloy.

According to the invention, it is possible to provide a paste composition for aluminum brazing excellent in all of storage stability in long term, applicability, particularly the discharge property and pressure stability by using a dispenser, and brazing property. Since the paste composition for aluminum brazing of the invention contains a metal powder for brazing (a brazing filler metal) and a flux so that all of the materials can be supplied together at the time of brazing, an effect of carrying out the coating work quickly and simply can be achieved.

DESCRIPTION OF PREFERRED EMBODIMENTS

A paste composition for aluminum brazing of the invention (hereinafter, sometimes referred to as "paste composition") contains a metal powder for brazing (a), a fluoride type flux (b), a methacrylic acid ester type polymer (c), and an organic solvent (d).

The metal powder for brazing (a) (it is defined as a component (a)) composing the paste composition of the invention is to be added as a brazing filler metal powder. The above-mentioned component (a) is not particularly limited and those which have conventionally been used for brazing aluminum may be arbitrarily used. Practically, the above-mentioned component (a) is preferably at least one selected from the group consisting of metal silicon, a silicon-aluminum alloy, a silicon-zinc alloy, a silicon-aluminum-zinc alloy, a silicon-magnesium alloy, a silicon-aluminum-magnesium alloy, a silicon-copper alloy, a silicon-aluminum-copper alloy, and aluminum-zinc alloy. The component (a) may be only one of them or two or more.

The fluoride type flux (b) (it is defined as a component (b)) composing the paste composition of the invention works to remove an oxide film on a surface of aluminum. For example, a chloride type flux has a function of removing the oxide film, however, when the chloride type flux is used, there is concern that a molding obtained after brazing, such as heat exchanger and the like, would be corroded. On the other hand, the fluoride type flux is noncorrosive, so it can avoid the risk of corrosion after brazing. The component (b) is not particularly limited and those which have conventionally been used for brazing aluminum may be arbitrarily used. Practically, the component (b) is preferably at least one selected from the group consisting of potassium fluoroaluminate, potassium fluoride, aluminum fluoride, lithium fluoride, sodium fluoride, potassium fluoroaluminate-cesium complex (non-reactive cesium type flux), cesium fluoroaluminate (non-reactive cesium type flux), potassium fluorozincate (reactive zinc-substituted flux), and cesium fluorozincate (reactive zinc-substituted flux). The component (b) may be only one of them or two or more.

Commercialized fluxes to be used as the above-mentioned component (b) are, for example, "Nocolok Flux (potassium fluoroaluminate)" and "Nocolok Cs Flux (a cesium type flux)" manufactured by Solvay. Further, "Nocolok Sil Flux (a mixture of potassium fluoroaluminate and metal silicon powder)" manufactured by Solvay, which is commercialized as a mixture of the component (a) and the component (b) can also be used.

The methacrylic acid ester type polymer (c) (it is defined as a component (c)) composing the paste composition of the invention works as a binder at the time of applying the paste composition of the invention to an aluminum member. Examples of the methacrylic acid ester type polymer (c) may include homopolymers of various kinds of methacrylic acid esters, copolymers of various kinds of methacrylic acid esters, and copolymers of various kinds of methacrylic acid esters with hydrophobic monomers or hydrophilic monomers. The component (c) may be only one of them or two or more.

Preferable examples of the above-mentioned various kinds of methacrylic acid esters may be $C_1$ to $C_{18}$ alkyl esters such as methyl methacrylate, ethyl methacrylate, propyl methacrylate, butyl methacrylate, 2-ethylhexyl methacrylate, lauryl methacrylate, and the like; hydroxyl group-containing methacrylic acid esters such as 2-hydroxyethyl methacrylate, hydroxypropyl methacrylate, methacrylic acid polypropylene glycol ester, methacrylic acid polyethylene glycol ester as well as methacrylic acid esters in which alkylene oxide is added to the ester moiety (e.g. $CH_2=C(CH_3)COO(C_2H_4O)_nH$, wherein n is, for example, an integer of 2 to 12); and the like.

Examples of the hydrophobic monomers may include styrenes such as styrene, α-methylstyrene, vinyltoluene, p-chlorostyrene and the like.

Examples of the hydrophilic monomers may include unsaturated carboxylic acids such as methacrylic acid, itaconic acid, crotonic acid, maleic acid (anhydride), fumaric acid, citraconic acid (anhydride), and their salts; unsaturated sulfonic acids such as styrenesulfonic acid, vinylsulfonic acid, allylsulfonic acid, isoprenesulfonic acid, and their salts; and methacrylic acid is preferable among them.

Since a powder of a metal for brazing such as an aluminum alloy is generally hydrophilic in the surface, it is desirable to select a monomer having hydrophilicity as a monomer composing the above-mentioned component (c) in terms of the dispersibility and affinity. However, since the above-mentioned hydrophilic monomers, for example, carboxyl group-containing monomers and sulfonic acid group-containing monomers are acidic components, in some cases, reaction of the monomers with brazing filler metals may be concerned and also a problem of the brazing property in terms of thermal decomposition may occur. Accordingly, in consideration of the dispersibility and affinity with the metal powder for brazing, in the case of selecting a monomer having hydrophilicity, it is preferable to use a hydroxyl group-containing monomer. In this case, the content of the hydroxyl group-containing monomer in the entire monomers composing the component (c) is preferably 10% by weight or less in consideration of the solubility in a hydrocarbon type organic solvent as the organic solvent (d).

From a viewpoint of the above-mentioned matter, in the invention, the methacrylic acid ester type polymer (c) is preferably a polymer selected from the group consisting of homopolymers of $C_1$ to $C_{18}$ alkyl esters of methacrylic acid and copolymers of $C_1$ to $C_{18}$ alkyl esters of methacrylic acid and hydroxyl group-containing methacrylic acid esters and particularly preferably copolymers of $C_1$ to $C_{18}$ alkyl esters of methacrylic acid and hydroxyl group-containing methacrylic acid esters.

The above-mentioned methacrylic acid ester type polymer (c) may be obtained by radical polymerization of prescribed monomers in accordance with a conventionally known polymerization method such as bulk polymerization, solution polymerization, suspension polymerization, and the like.

In the paste composition of the invention, as long as the content of the component (c) is within a range described later, those other than the component (c) may be used as a binder. In such a case, if a monomer composing the binder other than the component (c) includes an acrylic monomer such as an acrylic acid ester and acrylic acid, the brazing property is deteriorated. Further, as a hydrophilic monomer composing the component (c), if an acrylic monomer is contained, the brazing property is also deteriorated. Accordingly, in the paste composition of the invention, it is preferable to eliminate an acrylic monomer from all of the constituent components.

The methacrylic acid ester type polymer (c) has a weight average molecular weight (hereinafter, sometimes abbreviated as "Mw") preferably 500,000 to 2,000,000 and more preferably 600,000 to 1,200,000. If the weight average molecular weight is lower than the above-mentioned range, the pressure stability of a dispenser may be possibly deteriorated and on the other hand, if it is higher than the above-mentioned range, the discharge control of the dispenser may be possibly difficult.

The organic solvent (d) (it is defined as component (d)) composing the paste composition of the invention is a hydrocarbon type organic solvent having neither an aromatic ring nor a hydroxyl group. An aromatic ring-containing solvent (that is, an aromatic type solvent) is excluded in terms of industrial hygiene, safety, environmental preservation, and malodor. A hydroxyl group-containing solvent (that is, an alcohol type solvent) is excluded in terms of storage stability. Particularly, a hydroxyl group-containing solvent tends to be reacted with the brazing filler metal powder with progress of time in the case of coexistence of water and thus may become a cause of deteriorating storage stability and safety. The component (d) may be only one or two or more.

The hydrocarbon type organic solvent to be the component (d) is not particularly limited if it does not have an aromatic ring and hydroxyl group and any solvents may be used. For example, naphthene type alicyclic hydrocarbons and the like are preferable. In terms of smoothness of a work by malodor suppression, the boiling point of the hydrocarbon type organic solvent is preferably 150° C. or higher and more preferably 180° C. or higher. Examples of commercialized hydrocarbon type organic solvents to be usable as the component (d) may include, for example, "Exxsol D 80" manufactured by Exxon Mobile Corporation.

In the paste composition of the invention, the contents of the components (a) to (d) in the composition are respectively as follows.

metal powder for brazing (a): 40 to 65% by weight, preferably 45 to 55% by weight fluoride type flux (b): 5 to 35% by weight, preferably 10 to 25% by weight methacrylic acid ester type polymer (c): 1 to 10% by weight, preferably 3 to 5% by weight organic solvent (d): 10 to 40% by weight, preferably 20 to 35% by weight If the contents of the above-mentioned component (a) and the above-mentioned component (b) are less than the above-mentioned ranges, respectively, it becomes impossible to exhibit the function as the brazing composition and on the other hand, if the contents are higher than the above-mentioned ranges, since the ratios of other components are relatively decreased, an undesirable consequence, e.g., deterioration of applicability or the like, may be caused. If the content of the component (c) is less than the above-mentioned range, the brazing property is deteriorated and on the other hand, if the content is higher than the range, the brazing property is also deteriorated. If the content of the component (d) is less than the above-mentioned range, the fluidity is deteriorated and application becomes difficult and on the other hand, if the content is higher than the range, the viscosity is lowered and the metal powder for brazing is precipitated with the lapse of time and the storage stability is worsened and consequently, it leads to deterioration of the quality itself of a product at the time of application or decrease of the stability of the quality.

The paste composition of the invention may contain, based on the necessity, various kinds of additives such as an antioxidant (e.g. BHT or the like), a corrosion inhibitor (e.g. benzotriazole or the like), a defoaming agent (e.g. silicon oil, glycerin, or the like), a thickener (e.g. wax, hardened oil, fatty acid amides, polyamides, or the like), and a coloring agent to an extent that the effect of the invention is not deteriorated. Particularly, if a thickener is added, the storage stability, dripping prevention property, and brazing property of a paste composition to be obtained are further improved and therefore, it is preferable.

The above-mentioned thickener is not particularly limited; however at least one selected from the group consisting of a fatty acid amide type thickener and a hardened caster oil type thickener is preferable. The content of the thickener is generally 0.1 to 5% by weight and preferably 0.3 to 1% by weight to the composition. If the content of the thickener is less than the range, the effect of improving the storage stability and the dripping prevention property may be possibly insufficient and on the other hand, if the content is higher than the range, the brazing property may be rather decreased. Examples of commercialized products of the fatty acid amide type thickener include, "Neutron", "Neutron-P", "Neutron-2", "Neutron-S", and "Neutron-D" manufactured by Nippon Fine Chemical Co., Ltd.; "ITOHWAX J-50", "ITOHWAX J-400", "ITOHWAX J-420", "ITOHWAX J-500", "ITOHWAX J-510", "ITOHWAX J-520", "ITOHWAX J-530", "ITOHWAX J-550S", "ITOHWAX J-610", "ITOHWAX J-630", "ITOHWAX J-700", "ASA-T", and "ASA-D" manufactured by Itoh Oil Chemicals Co., Ltd.; "AP-1", "D-O-200", "NA-SO", "SLIPACKS-E", "SLIPACKS-O", "SLIPACKS-PXS", and "SLIPACKS-H" manufactured by Nippon Kasei Chemical Co., Ltd.; and "NEWMIDE 825", "NEWMIDE 830", "NEWMIDE 840", "NEWMIDE 850", and "NEWMIDE 945" manufacture by Harima Chemicals, Inc., and among them, "SLIPACKS-H" manufactured by Nippon Kasei Chemical Co., Ltd., is particularly suitable. Examples of commercialized products of a hardened caster oil type thickener include, "Lick kaizer GR-301", "Lick kaizer GR-501" and "Hydrogenated castor oil" manufactured by Itoh Oil Chemicals Co., Ltd.

The paste composition of the invention is required to be in a paste-like state having viscosity of 6,000 to 200,000 mPa·s at 23° C. The viscosity is preferably 6,000 to 100,000 mPa·s at 23° C. If the viscosity of the paste composition exceeds the upper limit of the above-mentioned range, the fluidity is decreased and discharge from a dispenser becomes impossible and application becomes difficult and on the other hand, if it is lower than the lower limit of the range, the brazing filler metal powder is precipitated with the lapse of time and thus a problem of storage stability occurs. The viscosity of the composition in the invention may be measured by using a spiral viscometer at a stirring speed of 10 rpm.

With respect to the paste composition of the invention, those having relatively low viscosity at 23° C. are suitable for linear application since discharge from a dispenser is smooth and on the other hand, those having relatively high viscosity are suitable for dot-application since discharge dripping from a dispenser scarcely occurs.

A method for brazing aluminum of the invention is a method for brazing aluminum members by applying the paste composition of the invention to the aluminum members and heating the members in a state that the members are assembled in a prescribed structure.

A method of applying the paste composition to an aluminum member is not particularly limited and conventionally known methods such as brush application, a spraying coating, a roll coater, a bar coater, a doctor blade, and the like can be employed. The application amount of the paste composition is also not particularly limited and in consideration of the structure of a member to be brazed, it may be properly set to give sufficient joining strength after brazing. In addition, after application of the paste composition, before or after assembly of the members in a prescribed structure, the paste composition may be dried if necessary.

After application of the paste composition, at the time of heating the members in a state that the members are assembled in the prescribed structure, for example, a method of carrying out brazing in a furnace may be employed according to a conventionally known brazing method. The heating temperature (brazing temperature) is generally about 450° C. to 630° C. although it depends on the paste composition. The ambient atmosphere at the time of heating is not particularly limited; however atmosphere of vacuum, Ar, nitrogen, or the like is preferable.

Hereinafter, the invention will be described with reference to Examples.

EXAMPLES

Among the following Examples 1 to 6, Example 6 is an example using no thickener and the others are examples all containing thickeners.

Examples 1 to 3 are examples in which the types of metal powders for brazing (brazing filler metal powders) as the component (a) vary, and the components and the compositions other than the component (a) are made in common. Example 4 is an example in which the types of the methacrylic acid ester type polymer as the component (c) vary while using Example 1 as a base. Example 5 is an example in which a composition entirely varies from those of Examples 1 to 4. As the component (c) (binder), a homopolymer of 2-ethylhexyl methacrylate (methacrylic acid ester type polymer (A)) was used for Examples 1 to 3 and 5 and a copolymer of 2-ethylhexyl methacrylate and 2-hydroxyethyl methacrylate (methacrylic acid ester type polymer (C)) was used for Examples 4 and 6.

On the other hand, among the following Comparative Examples 1 to 8, Comparative Example 1 is an example in which the viscosity of the paste composition exceeds the upper limit of the proper range of the invention. Comparative Example 2 is an example in which the paste composition has a viscosity lower than the lower limit of the proper range of the invention and the weight average molecular weight of the methacrylic acid ester type polymer as the component (c) is 90,000. Comparative Example 3 is an example in which no flux is contained and the content of the metal powder for brazing as the component (a) exceeds the upper limit of the proper range of the invention. Comparative Example 4 is an example in which an acrylic resin (acrylic acid ester type polymer (E)) is used as the binder according to Japanese Patent No. 2681380 described at beginning and ethanol is used as a solvent and the viscosity of the paste composition is lower than the lower limit of the proper range of the invention. Comparative Example 5 is an example in which butyl rubber is used as the binder according to Japanese Patent No. 3705939 described at beginning and toluene is used as a solvent. Comparative Example 6 is an example in which the content of the methacrylic acid ester type polymer exceeds the upper limit of the proper range of the invention. Comparative Example 7 is an example in which no binder is used and the amount of the thickener (a fatty acid amide) is increased to 1.2 parts by weight. Comparative Example 8 is an example which satisfied the factors of the invention except that an acrylic acid ester type polymer (F) is used in place of the methacrylic acid ester type polymer.

In the following Examples and Comparative Examples, "part(s)" and "%" are on the basis of weight unless otherwise specified.

Examples 1 to 6 and Comparative Examples 1 to 8

The respective components based on the compositions shown in Table 1 and Table 2 were mixed to produce paste compositions for aluminum brazing having the viscosities (23° C.) shown in Table 1 and Table 2. The obtained paste compositions were measured with respect to the viscosities at 23° C. by using a spiral pump viscometer ("PCU-205" manufactured by Malcom Co., Ltd.) at a stirring speed of 10 rpm, and were respectively subjected to the following evaluation tests (i) to (vi). The results are also shown in Table 1 and Table 2.

Details of the mixed components shown in Table 1 and Table 2 are as follows.

<Metal Powders for Brazing (Brazing Filler Metal Powders)>
Al-12 Si alloy: average particle diameter=52 μm
Al-10 Si alloy: average particle diameter=55 μm
Al-10 Si-1 Zn alloy: average particle diameter=49 μm
<Fluxes>
Fluoride type flux (potassium fluoroaluminate): "Nocolok Flux 100" manufactured by Solvay
<Binders>
Methacrylic acid ester type polymer (A): 2-ethylhexyl methacrylate homopolymer (Mw=752,000)
Methacrylic acid ester type polymer (B): 2-ethylhexyl methacrylate: 2-hydroxyethyl methacrylate (96:4 (wt. %)) copolymer (Mw=1,520,000)

Methacrylic acid ester type polymer (C): 2-ethylhexyl methacrylate: 2-hydroxyethyl methacrylate (97:3 (wt. %)) copolymer (Mw=1,050,000)

Methacrylic acid ester type polymer (D): 2-ethylhexyl methacrylate: 2-hydroxyethyl methacrylate (97:3 (wt. %)) copolymer (Mw=90,000)

Acrylic acid ester type polymer (E): ethyl acrylate:2-ethylhexyl acrylate (97: 3 (wt. %)) copolymer (Mw=76,000)

Acrylic acid ester type polymer (F): n-butyl acrylate:ethyl acrylate: 2-hydroxyethyl acrylate (30:67:3 (wt. %)) copolymer (Mw=650,000)

Butyl rubber: "Vistanex 100" manufactured by Exxon Mobile Corporation

<Solvents>

Hydrocarbon type organic solvent: "Exxsol D 80" (boiling point: 200° C. to 250° C.) manufactured by Exxon Mobile Corporation Toluene Ethanol <Thickeners>

Fatty bisacid amide type thickener: "SLIPACKS-H" manufactured by Nippon Kasei Chemical Co., Ltd.

[Evaluation Tests]

(i) Malodor

Malodor was evaluated based on the following standard.
○: Malodor was scarcely smelled
x: Malodor was smelled (ii) Storage Stability Excellence of the storage stability was evaluated based on the following standard when 200 g of each paste composition was put in a 200-cc glass bottle and stored at 23° C. for 2 months.
○: Scarcely changed as compared with the initial state
Δ: Although slight phase separation occurred as compared with the initial state, it was turned back to the initial state by stirring
x: Separation was considerable as compared with the initial state and it was not turned back to the initial state even by stirring (iii) Application Stability (Dispenser Discharge Property)

The stability of discharge amount was evaluated based on the following standard when 10 g of each paste composition was put in a clear syringe ("PSY-10 E model" manufactured by Musashi Engineering, Inc.) and a discharge port with an inner diameter of 2.5 mm was attached thereto and discharge for 0.01 second and un-discharge for 1 second were repeated at discharge pressure of 0.5 MPa using a dispenser ("DX-350 model", manufactured by OK International, Inc.).
○: Difference of the discharge amount was less than ±3% in cycles repeated 50 times
Δ: Difference of the discharge amount was within ±3 to 10% in cycles repeated 50 times
x: Difference of the discharge amount was over ±10% in cycles repeated 50 times (iv) Application Stability (Dispenser Pressure Stability)

When 10 g of each paste composition was put in a clear syringe ("PSY-10 E model" manufactured by Musashi Engineering, Inc.) and a discharge port with an inner diameter of 2.5 mm was attached thereto and after discharge for 0.01 second at discharge pressure of 0.5 MPa, the discharge port was sealed while the pressure was kept and the state was left for 1 day, and thereafter discharge for 0.01 second was again carried out using a dispenser ("DX-350 model", manufactured by OK International, Co.), the difference of discharge amount before and after standstill was evaluated based on the following standard.
○: Difference of the discharge amount was less than ±3%
Δ: Difference of the discharge amount was within ±3 to 10%
x: Difference of the discharge amount was over 110% or discharge was not carried out (v) Dripping Prevention Property After 0.1±0.01 g of each paste composition was applied in a circular shape with a diameter of 10 mm to an aluminum plate (JIS-A3003 alloy), the aluminum plate was kept vertically and left at 23° C. for 30 minutes and the dripping state of the paste composition was visually observed and evaluated based on the following standard.
○: Dripping of less than 5 mm
Δ: Dripping of 5 mm or more and less than 10 mm was observed
x: Dripping of 10 mm or more was observed (vi) Brazing Property Each paste composition was applied in a width of about 5 mm and a height of about 2 mm in the center part in parallel to the longitudinal direction of an aluminum plate (JIS-A3003 alloy) of 25 mm×60 mm size. On the other hand, another sheet of an aluminum plate (JIS-A3003 alloy) of 25 mm×60 mm size was made ready and perpendicularly stood (reversed T-shaped form) and fixed with a stainless wire in such a manner that the latter plate was brought into contact with the applied paste composition to produce a test specimen for brazing evaluation.

Next, the above-mentioned test specimen was inserted in a box type brazing furnace ("A-BC-M model", manufactured by Noritake TCF Co., Ltd.) and heated from 30° C. to 610° C. in about 10 minutes under a nitrogen atmosphere (oxygen concentration: 100 ppm or lower) to carry out brazing. Thereafter, the formation state of the fillet after the brazing was visually observed and excellence of the brazing property was evaluated based on the following standard.
○: Complete fillet was formed and sufficient joint strength was obtained
Δ: Fillet formation was insufficient and joining strength was weak
x: Brazing was incomplete and joining was not carried out

TABLE 1

| | | | Example 1 | Example 2 | Example 3 | Example 4 | Example 5 | Example 6 |
|---|---|---|---|---|---|---|---|---|
| Component (Parts by weight) | Brazing filler metal powders | Al-12 Si alloy | 50 | — | — | 50 | 60 | 50 |
| | | Al-10 Si alloy | — | 50 | — | — | — | — |
| | | Al-10 Si-1 Zn alloy | — | — | 50 | — | — | — |
| | Fluxes | | 15 | 15 | 15 | 15 | 18 | 15 |
| | Binders | Methacrylic acid ester type polymer (A) | 4 | 4 | 4 | — | 4 | — |
| | | Methacrylic acid ester type polymer (B) | — | — | — | — | — | — |
| | | Methacrylic acid ester type polymer (C) | — | — | — | 4 | — | 4 |
| | | Methacrylic acid ester type polymer (D) | — | — | — | — | — | — |

TABLE 1-continued

|  |  |  | Example 1 | Example 2 | Example 3 | Example 4 | Example 5 | Example 6 |
|---|---|---|---|---|---|---|---|---|
|  |  | Acrylic acid ester type polymer (E) | — | — | — | — | — | — |
|  |  | Acrylic acid ester type polymer (F) | — | — | — | — | — | — |
|  |  | Butyl rubber | — | — | — | — | — | — |
|  | Solvents | Hydrocarbon type organic solvent | 30.5 | 30.5 | 30.5 | 30.5 | 17.5 | 31 |
|  |  | Toluene | — | — | — | — | — | — |
|  |  | Ethanol | — | — | — | — | — | — |
|  | Thickeners |  | 0.5 | 0.5 | 0.5 | 0.5 | 0.5 | — |
| Viscosity of composition (mPa · s/23° C.) |  |  | 8,520 | 10,260 | 11,360 | 54,620 | 156,200 | 24,120 |
| Evaluation results | Malodor |  | ○ | ○ | ○ | ○ | ○ | ○ |
|  | Storage stability |  | ○ | ○ | ○ | ○ | ○ | Δ |
|  | Application stability | Dispenser discharge property | ○ | ○ | ○ | ○ | ○ | ○ |
|  |  | Dispenser pressure stability | ○ | ○ | ○ | ○ | ○ | Δ |
|  | Dripping prevention property |  | Δ | ○ | ○ | ○ | ○ | ○ |
|  | Brazing property |  | ○ | ○ | ○ | ○ | ○ | ○ |

TABLE 2

|  |  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Component (Parts by weight) | Brazing filler metal powders | Al-12 Si alloy | 50 | 50 | 70 | 50 | — | 50 | 50 | — |
|  |  | Al-10 Si alloy | — | — | — | — | — | — | — | — |
|  |  | Al-10 Si-1 Zn alloy | — | — | — | — | 50 | — | — | 50 |
|  | Fluxes |  | 15 | 15 | — | 15 | 15 | 15 | 15 | 15 |
|  | Binders | Methacrylic acid ester type polymer (A) | — | — | 4 | — | — | 12 | — | — |
|  |  | Methacrylic acid ester type polymer (B) | 4 | — | — | — | — | — | — | — |
|  |  | Methacrylic acid ester type polymer (C) | — | — | — | — | — | — | — | — |
|  |  | Methacrylic acid ester type polymer (D) | — | 4 | — | — | — | — | — | — |
|  |  | Acrylic acid ester type polymer (E) | — | — | — | 5 | — | — | — | — |
|  |  | Acrylic acid ester type polymer (F) | — | — | — | — | — | — | — | 4 |
|  |  | Butyl rubber | — | — | — | — | 5 | — | — | — |
|  | Solvents | Hydrocarbon type organic solvent | 30.5 | 30.5 | 25.5 | — | — | 22.5 | 33.8 | 30.5 |
|  |  | Toluene | — | — | — | — | 30 | — | — | — |
|  |  | Ethanol | — | — | — | 30 | — | — | — | — |
|  | Thickeners |  | 0.5 | 0.5 | 0.5 | — | — | 0.5 | 1.2 | 0.5 |
| Viscosity of composition (mPa · s/23° C.) |  |  | 240,500 | 4,530 | 32,500 | 3,580 | 24,500 | 80,100 | 100,800 | 13,560 |
| Evaluation results | Malodor |  | ○ | ○ | ○ | × | × | ○ | ○ | ○ |
|  | Storage stability |  | ○ | × | ○ | × | ○ | ○ | ○ | ○ |
|  | Application stability | Dispenser discharge property | × | Δ | ○ | × | ○ | ○ | ○ | Δ |
|  |  | Dispenser pressure stability | ○ | × | ○ | × | Δ | ○ | ○ | ○ |
|  | Dripping prevention property |  | ○ | × | ○ | × | × | ○ | ○ | ○ |
|  | Brazing property |  | ○ | ○ | × | × | ○ | × | × | × |

From Table 1 and Table 2, the following are made clear.

That is, in Comparative Example 1 in which the viscosity of the paste composition for brazing was higher than the proper range of the invention, the discharge stability by using a dispenser was inferior. On the contrary, in Comparative Example 2 in which the viscosity of the paste composition for brazing was lower than the proper range of the invention, the pressure stability of the dispenser was inferior. In both cases, the application stability was deteriorated. Further, in Comparative Example 2, since the viscosity of the composition was too low, the brazing filler metal powder was precipitated with the lapse of time and thus the storage stability was also deteriorated.

On the other hand, in Examples 1 to 6 in which the viscosity of the paste compositions was in the proper range of the invention, the application stability (discharge property and pressure stability) was excellent and the other properties such as storage stability and brazing property were also excellent.

Accordingly, importance of keeping the viscosity of a paste composition in the proper range of the invention can be confirmed.

The weight average molecular weights of the methacrylic acid ester type polymer (A) and the methacrylic acid ester type polymer (C) used for Examples 1 to 6 were in a range of 600,000 to 1,200,000 and in relation to the optimization of the above-mentioned viscosity, the properties and functions of the compositions could be improved more by optimizing the weight average molecular weight of the methacrylic acid ester type polymers to be a binder in a preferable range (600,000 to 1,200,000).

Even if the viscosity of a paste composition is within the proper range of the invention, in Comparative Example 6 in which the content of the methacrylic acid ester type polymer as a binder was more than the proper amount of the invention, the brazing property was worsened. In Comparative Example 7 in which no binder was used and the viscosity was optimized by increasing the thickener, the brazing property was also worsened due to the bad effect of the increased thickener.

On the other hand, in Comparative Example 3 in which no flux was contained and the content of the brazing filler metal exceeds the proper amount of the invention, the brazing property was worse.

On the contrary, in Examples 1 to 6 in which the methacrylic acid ester type polymers, the brazing filler metal, and flux were contained in the respective proper ranges of the invention, the paste compositions were excellent in the brazing property and other evaluated properties and functions.

Accordingly, importance of addition of (a) a metal powder for brazing, (b) a fluoride type flux, (c) a methacrylic acid ester type polymer, and (d) an organic solvent in the respective proper contents as constituent components of a paste composition was confirmed.

In Comparative Example 8 in which although the contents of components (a) to (d) and the viscosity of the composition were satisfied, the binder was not methacrylic acid ester type polymer but an acrylic type polymer, the brazing property was inferior and the discharge stability of the dispenser was also inferior. Further, in Comparative Example 4 in which an acrylic type polymer was used as a binder and the viscosity of the composition and the type of solvent were out of the factors of the invention, properties and functions such as the brazing property, application stability, and storage stability were all worsened. Furthermore, in Comparative Example 5 in which butyl rubber was used as a binder and the type of solvent was out of the factor of the invention, dripping prevention property was worse and the discharge stability of the dispenser was also inferior. In addition, Comparative Example 4 and Comparative Example 5 had a problem in terms of malodor.

On the other hand, in Examples 1 to 6 in which the methacrylic acid ester type polymers were selected as a binder and hydrocarbon type organic solvents having no aromatic ring and no hydroxyl group were selected as a solvent, the brazing property and other evaluated properties and functions were excellent.

Accordingly, it was confirmed to be important to select a methacrylic acid ester type polymer for a binder and a hydrocarbon type organic solvent having no aromatic ring and no hydroxyl group for an solvent in order to improve the application stability, storage stability, dripping prevention property, and brazing property in good balance and avoid the problem of malodor.

Next, when Examples 1 to 6 were relatively evaluated, as compared with Example 6 in which no thickener was contained, Examples 1 to 5 in which the thickener (fatty acid amide) was contained were found being superior in terms of the storage stability and pressure stability of the dispenser. However, although being slightly inferior to those of Examples 1 to 5, the storage stability and pressure stability of the dispenser of Example 6 were satisfactorily high level for practical use.

In Example 1, the dripping prevention property was slightly lowered as compared with those of the other Examples, it was a level sufficient for practical use. It is supposedly attributed to that the viscosity of the composition of Example 1 was lower than those of the other Examples.

The above description illustrates an embodiment of the invention. It is not intended that the invention be limited to the illustrated embodiments. Modifications can be made without departing from the spirit and scope of the invention.

What is claimed is:

1. A paste composition for aluminum brazing comprising 40 to 65% by weight of a metal powder for brazing (a),
   5 to 35% by weight of a fluoride type flux (b),
   1 to 10% by weight of a methacrylic acid ester type polymer (c), and
   10 to 40% by weight of an organic solvent (d),
   wherein the organic solvent (d) is a naphthene type alicyclic hydrocarbon having no aromatic ring and no hydroxyl group, where the naphthene type alicyclic hydrocarbon type organic solvent has a boiling point of 150° C. or higher, the methacrylic acid ester type polymer(c) is a polymer selected from the group consisting of homopolymers of $C_1$ to $C_{18}$ alkyl esters of methacrylic acid and copolymers of $C_1$ to $C_{18}$ alkyl esters of methacrylic acid and hydroxyl group-containing methacrylic acid esters, where the hydroxyl group-containing methacrylic acid esters have neither a carboxyl group nor a sulfonic acid group, and the composition is a paste-like state having a viscosity of 6,000 to 200,000mPa·s at 23° C.

2. The paste composition for aluminum brazing according to claim 1, wherein the weight average molecular weight of the methacrylic acid ester type polymer (c) is 500,000 to 2,000,000.

3. The paste composition for aluminum brazing according to claim 1, further comprising a thickener.

4. The paste composition for aluminum brazing according to claim 3, wherein the thickener is at least one selected from the group consisting of a fatty acid amide type thickener and a hardened caster oil type thickener.

5. The paste composition for aluminum brazing according to claim 3, wherein the content of the thickener is 0.1 to 5% by weight in the composition.

6. The paste composition for aluminum brazing according to claim 1, wherein the metal powder for brazing (a) is at least one selected from a group consisting of metal silicon, a silicon-aluminum alloy, a silicon-zinc alloy, a silicon-aluminum-zinc alloy, a silicon-magnesium alloy, a silicon-aluminum-magnesium alloy, a silicon-copper alloy, a silicon-aluminum-copper alloy, and aluminum-zinc alloy.

7. The paste composition for aluminum brazing according to claim 1, wherein the fluoride type flux (b) is at least one selected from the group consisting of potassium fluoroaluminate, potassium fluoride, aluminum fluoride, lithium fluoride, sodium fluoride, potassium fluoroaluminate-cesium complex, cesium fluoroaluminate, potassium fluorozincate, and cesium fluorozincate.

8. A method for brazing a member made of aluminum, comprising applying the paste composition for aluminum brazing according to any one of claims 1, 2, and 3 to 7 to the member and heating the member in a state that the member is assembled in a prescribed structure.

* * * * *